Aug. 21, 1923.
J. B. ALTMAN
1,465,592
WINDMILL
Filed Sept. 24, 1921
2 Sheets-Sheet 1
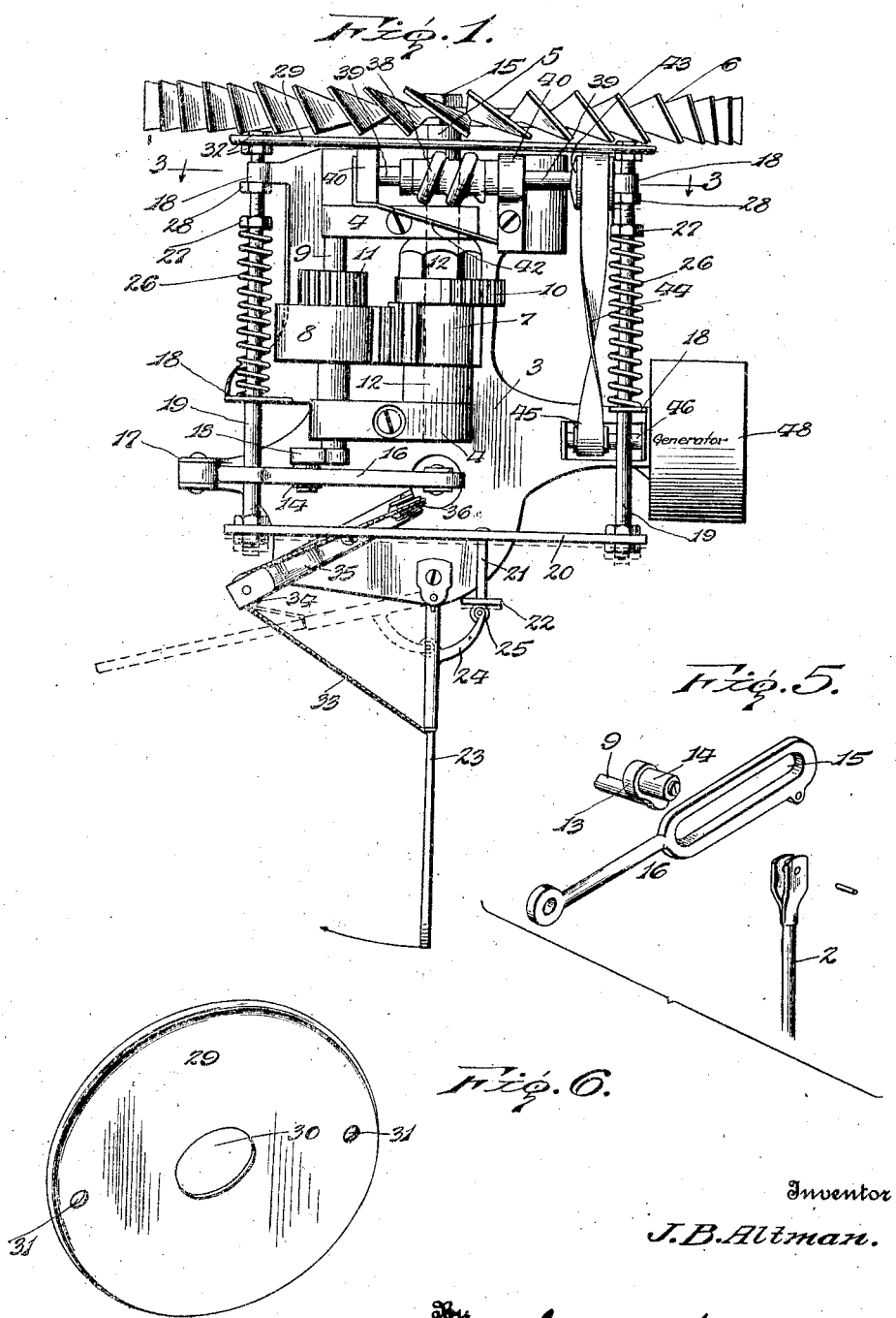
Inventor
J. B. Altman.

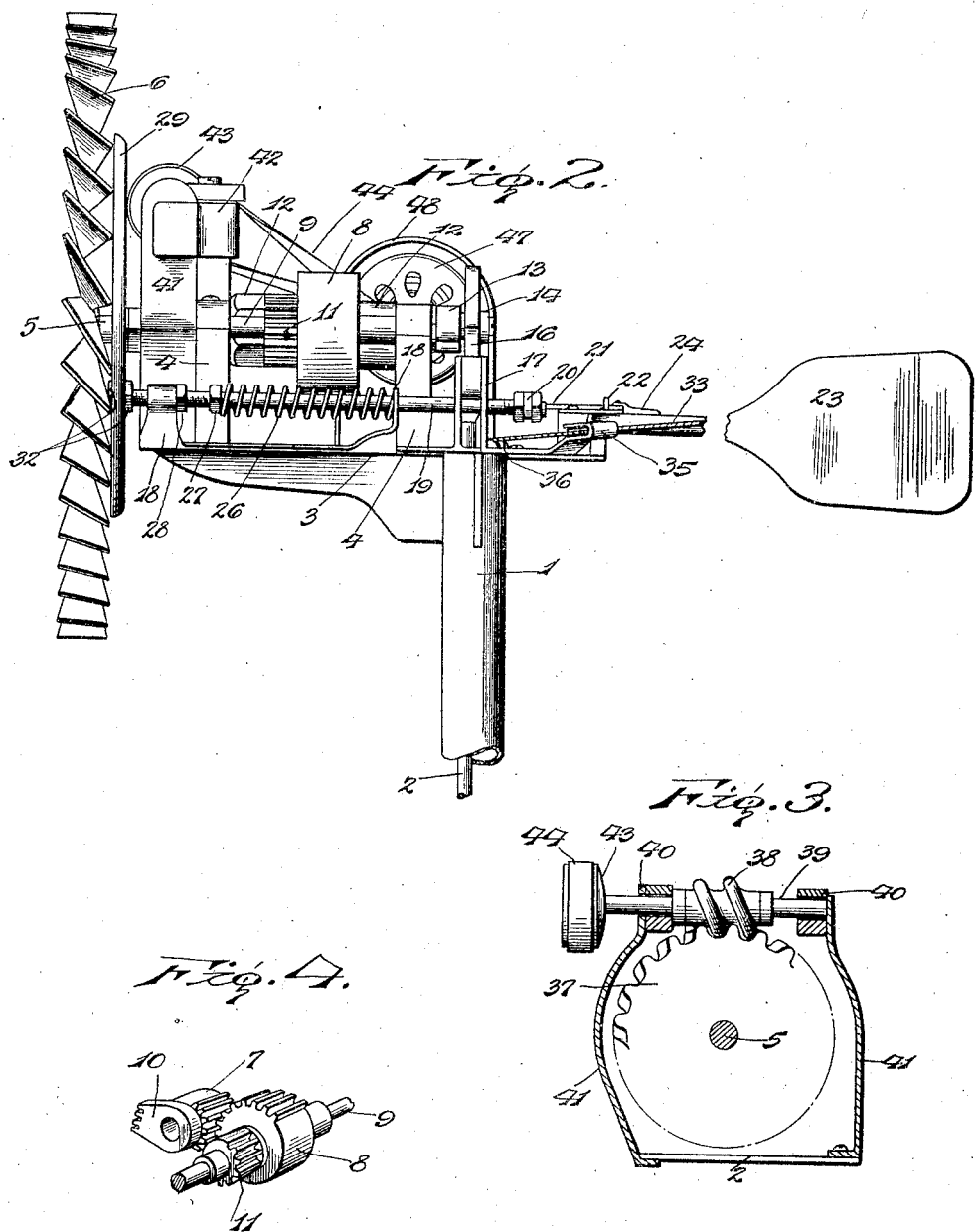

Patented Aug. 21, 1923.

1,465,592

UNITED STATES PATENT OFFICE.

JOHN B. ALTMAN, OF AURORA, ILLINOIS.

WINDMILL.

Application filed September 24, 1921. Serial No. 502,865.

*To all whom it may concern:*

Be it known that I, JOHN B. ALTMAN, a citizen of the United States, residing at Aurora, in the county of Kane and State of Illinois, have invented certain new and useful Improvements in Windmills, of which the following is a specification.

This invention relates to windmills and has for one object the provision of means whereby a pump driven by air currents may be actuated at a low speed upon its lifting or working stroke and at a higher speed upon its return stroke. Another object of the invention is to provide novel means for preventing the mechanism being driven at an excessively high speed, and a further object of the invention is to provide means whereby energy may be stored for future use. The invention also seeks to improve generally the construction and arrangement of the parts of a windmill to the end that the cost of production may be reduced and the durability of the mechanism increased. The invention is illustrated in the accompanying drawings and will be hereinafter fully set forth.

In the drawings—

Figure 1 is a plan view of a windmill embodying my improvements;

Fig. 2 is a side elevation with parts in section of the same;

Fig. 3 is a detail sectional view on the line 3—3 of Fig. 1;

Fig. 4 is a detail perspective view of the transmission gearing;

Fig. 5 is a detail perspective view of the parts whereby the motion of the driving shaft is imparted to the plunger of the pump;

Fig. 6 is a detail perspective view of the governor disc.

In the drawings, the reference numeral 1 indicates the tubular casing through which the pump plunger 2 operates and which is supported upon the derrick (not shown) for turning movement in a well-known manner. The tubular casing 1 depends from a platform 3, and upon the said platform are mounted standards or bearings 4 of any preferred form in which the main driving shaft 5 is journaled, the wind wheel 6 being secured upon the outer end of the said shaft in the usual manner. Upon the main driving shaft 5, I mount a mutilated gear 7 which is adapted to mesh with a larger mutilated gear 8 upon a countershaft 9 which is also journaled in the bearings 4, as will be readily understood. Immediately adjacent the gear 7, a segment or mutilated gear 10 is mounted upon the main driving shaft 5, and this gear 10 is adapted to mesh with a mutilated pinion 11 upon the countershaft 9 immediately adjacent the gear 8, as shown and as will be readily understood. The gears may be fixed upon the respective shafts in any convenient or preferred manner and in the drawings I have shown spacers 12 upon the main driving shaft between the respective gears and the adjacent bearings. The gears are so arranged that the operative portion of one gear is in the same position with respect to its shaft as the smooth or inoperative portion of its companion gear so that, when the gears 7 and 8, for instance, are in mesh, as shown in the drawings, the gears 10 and 11 will be out of mesh and vice versa. The parts are also so arranged that, when the plunger or piston rod 2 is moving downwardly, the gears 10 and 11 will be in mesh and the plunger will be moving at a relatively high speed, but when the plunger has completed its down stroke and starts upon its lifting or working stroke, the gears 10 and 11 will cease to mesh and the gears 7 and 8 will simultaneously be brought into mesh so that the speed of the plunger will will be decreased but the power exerted through the same will be relatively increased.

The countershaft 9 extends through the inner bearings or standards 4 and is equipped with a crank 13 having a roller 14 at its outer end which plays in a longitudinal slot 15 of a lever 16 which is fulcrumed upon a post 17 erected at the edge of the platform 3 so that as the crank rotates the lever will be rocked or oscillated. The slot 15 extends to the free end of the lever 16 and to the free end of the lever the upper end of the pump plunger 2 is pivotally attached so that, as the lever is oscillated, the plunger will be reciprocated.

Upon the platform at the sides of the same, I provide posts or short standards 18 in which governor rods 19 are slidably mounted. The inner ends of the said governor rods are connected by a cross bar 20 from which an arm 21 extends, as clearly shown in Fig. 1, the said arm having a head or bearing plate 22 at its free end, as shown. A vane 23 is pivotally mounted upon the platform adjacent the arm 21 and is provided with a lateral arm or bracket 24 which carries a roller 25 at its free end adapted to bear against the head 22, as clearly shown in Fig. 1. Springs 26 are coiled around the governor rods 19 and bear at their inner ends against the adjacent posts 18 and at their outer ends against nuts or other adjustable abutments 27 upon the rods. Stops 28, which may be nuts threaded upon the governor rods, are carried by said rods and adapted to impinge against the inner sides of the outer posts 18, as shown in the drawings. The outer ends of the governor rods are normally spaced from the posts 18, and a governor plate or disc 29 is mounted upon and extends between the governor rods, being equipped at its center with an opening 30 through which the main driving shaft may pass so that there will be no resistance to the rotation of said shaft offered by the governor plate or disc. At diametrically opposite points, the governor disc is provided with openings 31 through which the outer ends of the governor rods extend and lock nuts 32 are mounted upon the governor rods at opposite sides of the disc to be turned home against the same and firmly secure the disc to the governor rods. The abutments 27 may obviously be adjusted longitudinally of the governor rods and the springs 26 be thereby put under any desired tension. Should the wind reach a velocity which would tend to drive the windmill and the pump at an excessive speed and, consequently, damage some of the working parts, the governor plate or disc 29 will be forced inwardly against the tension of the springs 26 and the governor rods would, of course, be moved longitudinally in their supports and pressure would be exerted through the arm 21 and the head 22 upon the vane and the lateral arm 24 of the same so that the vane would be swung toward the position indicated in dotted lines in Fig. 1. the result being that the entire mechanism would be swung around in its bearing in the derrick so that the edge of the wheel 6 would be presented to the wind and the motion of the working parts would cease.

A cable 33 is secured to the vane 23 and extends therefrom to and around a pulley 34 mounted in an arm 35 projecting from the platform, the cable then passing to and over a pulley 36 mounted upon the platform immediately adjacent the upper end of the tubular casing 1, whence the cable passes downwardly through the said casing to a point near the ground. If it be desired to stop the operation of the apparatus at any time, a downward pull is exerted upon the cable so that the vane will be swung to the position shown in dotted lines in Fig. 1 and will be thereby exposed to the force of the wind which will immediately act thereon so as to swing the entire mechanism about the mounting of the same in the derrick and present the edge of the wheel 6 to the wind, whereupon the rotation of the wheel will cease.

Between the governor disc 29 and the outer bearings 4, I secure upon the main driving shaft a worm gear 37 which meshes with a worm 38 upon a shaft 39 mounted in bearings 40 at the upper ends of posts 41 which rise from the platform 2 and are braced by a connecting strap 42. A pulley 43 is secured upon the end of the shaft 39 and a belt 44 is trained around the said pulley and around a pulley 45 secured upon a shaft 46 which is mounted in bearings provided upon the platform 2 and is connected with an electric generator 47 so as to operate said generator in any convenient manner. The generator may be of any well-known type and is illustrated in a conventional manner only. A hood 48 is provided over the generator so as to protect the same from the weather. The current produced in the generator may be carried over any convenient conductors to a storage battery plant and utilized to charge batteries for future use or it may be carried directly into electrically driven tools or machinery so as to actuate the same as is obvious.

From the foregoing description, taken in connection with the accompanying drawings, it will be seen that I have provided a very simple and compactly arranged mechanism which may be installed at a low cost and which will operate efficiently to drive a pump or other machine; which will generate electric energy very economically, and which will be automatically caused to stop its operation should it attain an abnormal velocity.

Having thus described the invention, what is claimed as new is:

In a windmill, the combination of a platform, a main driving shaft mounted upon the platform and having a wind wheel secured thereto, means for transmitting motion from the said shaft to elements to be driven, a governor disc disposed adjacent the wind wheel parallel therewith and concentric with the main driving shaft, governor rods secured to said disc and extending therefrom parallel with the main driving shaft and slidably mounted upon the platform, tension springs acting upon the governor rods to normally hold the governor disc toward the wind wheel, a vane pivotally mounted upon the platform, a bracket extending laterally from the vane, a cross bar connecting the governor rods, and an arm extending from said cross bar and bearing against the bracket on the vane whereby excessive wind pressure upon the governor disc will turn the vane to one side and stop the operation of the wind wheel.

In testimony whereof I affix my signature.

JOHN B. ALTMAN. [L. S.]